(12) United States Patent
Murashige et al.

(10) Patent No.: US 8,271,488 B2
(45) Date of Patent: Sep. 18, 2012

(54) METHOD FOR IMPROVING A WEB SITE'S RANKING WITH SEARCH ENGINES

(75) Inventors: Derek Murashige, Phoenix, AZ (US); Mikkel Schultz, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 1874 days.

(21) Appl. No.: 10/662,998

(22) Filed: Sep. 16, 2003

(65) Prior Publication Data
US 2005/0060168 A1   Mar. 17, 2005

(51) Int. Cl.
G06F 7/00      (2006.01)
G06F 17/30     (2006.01)
G06Q 40/00     (2012.01)

(52) U.S. Cl. .......................................... 707/735; 705/37

(58) Field of Classification Search .............. 707/3, 101, 707/100, 735; 705/1, 37; 715/530
See application file for complete search history.

(56) References Cited

U.S. PATENT DOCUMENTS

| | | | |
|---|---|---|---|
| 5,905,862 A * | 5/1999 | Hoekstra | ........................ 709/202 |
| 6,298,341 B1 | 10/2001 | Mann et al. | |
| 6,480,837 B1 * | 11/2002 | Dutta | ................................ 707/3 |
| 6,519,589 B2 | 2/2003 | Mann et al. | |
| 6,560,634 B1 | 5/2003 | Broadhurst | |
| 6,745,248 B1 | 6/2004 | Gardos et al. | |
| 6,789,103 B1 | 9/2004 | Kim et al. | |
| 6,880,007 B1 | 4/2005 | Gardos et al. | |
| 6,895,430 B1 | 5/2005 | Schneider | |
| 2002/0035611 A1 * | 3/2002 | Dooley | ........................ 709/218 |
| 2002/0065903 A1 | 5/2002 | Fellman | |
| 2002/0091827 A1 | 7/2002 | King et al. | |
| 2002/0129013 A1 | 9/2002 | Thomas | |
| 2004/0044791 A1 | 3/2004 | Pouzzner | |
| 2004/0068460 A1 * | 4/2004 | Feeley et al. | ..................... 705/37 |
| 2004/0088241 A1 * | 5/2004 | Rebane et al. | .................. 705/37 |
| 2004/0167982 A1 | 8/2004 | Cohen et al. | |
| 2004/0261023 A1 * | 12/2004 | Bier | .............................. 715/530 |
| 2005/0102354 A1 | 5/2005 | Hallenbeck et al. | |

* cited by examiner

*Primary Examiner* — Etienne Leroux
*Assistant Examiner* — Chelcie Daye
(74) *Attorney, Agent, or Firm* — Stewart J. Womack

(57) ABSTRACT

A program may be used to increase traffic flow to a Web site by analyzing, optimizing and submitting the Web site to one or more search engines. The program may accept search phrases and check the compatibility of the Web site with the search phrases as well as check the textual content, the parseability and the spiderability of the Web site. In a preferred embodiment, the analysis mimics the ranking methodologies used by the search engines. The program assists the owner of the Web site in optimizing the Web site for the search engines, possibly by automatically editing the code of the Web site, and submits the Web site for registration with the selected search engines. The program may be repeated from time to time to insure the Web site remains in an optimized state.

35 Claims, 7 Drawing Sheets

Fig. 2

| Search Phrase | "Keywords" <meta> Tag | "Description" <meta> Tag | Page Copy | "alt" Attributes |
|---|---|---|---|---|
| hit records | ✓ | ✓ | ✓ | ✓ |
| music | ✓ | ✓ | ✓ | ✓ |
| rap | ✓ | ✓ | ✓ | ✓ |

Report Summary for: rap

✓ <title> Tag — Warning: No search phrase found.

The entered search phrase rap was not found in your Web site's `<title>` tag.

In order to achieve the best search engine ranking results, a search phrase, ideally, should appear 1-2 times in a Web site's `<title>` tag.

More about <title> tags.

✓ Keywords <meta> Tag — No Problems Detected.

Search phrase found 3 times in "keywords" `<meta>` tag.

More about the "keywords" <meta> tag.

✓ Description <meta> Tag — Warning: No search phrase found.

The entered search phrase rap was not found in your Web site's description `<meta>` tag. Ideally, a search phrase should appear 2-4 times in a description `<meta>` tag. To attain the best possible search engine ranking for this site, add the search phrase to the description `<meta>` tag and run the Site Analysis again, before submitting the site to Internet search engines.

More about the "description" <meta> tag.

Fig. 3

SELECT SEARCH ENGINES                                  ◀back | next▶

<u>http://dre2001.com/</u>

200

Please select the search engines and Web directories you wish to submit your Web site to.

The engines and directories listed below all support automatic site submission. Click "Next" to submit your site to the supported dynamic-category directories (i.e. directories that require users to select both top-level and subcategories for submitted pages).

Free Search Engines

Please check the search engines you wish to submit your site to.

- ☑ <u>2kCity.com</u>
- ☑ <u>Aeiwi</u>
- ☑ <u>AlltheWeb (FAST)</u>
    Contributes content to: <u>Excite</u>, <u>HotBot</u>, <u>Lycos</u>, <u>MetaCrawler</u>, <u>WebCrawler</u>
- ☑ <u>Bertha</u>
- ☑ <u>CompletePlanet</u>
- ☑ <u>entireweb.com</u>
- ☑ <u>Findinfo.com</u>
- ☑ <u>Gigablast</u>
- ☑ <u>Go ISO</u>
- ☑ <u>Google</u>
    Contributes content to: <u>Excite</u>, <u>HotBot</u>, <u>iWon</u>, <u>MetaCrawler</u>, <u>WebCrawler</u>, <u>Yahoo!</u>
- ☑ <u>HaSearch</u>
- ☑ <u>hotrate.com</u>
- ☑ <u>ImproveMySearch.com</u>
- ☑ <u>IntelSeek</u>
- ☑ <u>Inter-Change Online</u>
- ☑ <u>Jadoo</u>
- ☑ <u>jblue</u>
- ☑ <u>Librarians' Index to the Internet</u>

METHOD FOR IMPROVING A WEB SITE'S RANKING WITH SEARCH ENGINES

FIELD OF THE INVENTION

The present invention relates to systems and processes for increasing traffic flow to a Web site on the Internet and more specifically for registering the Web site with a plurality of search engines in such a manner as to be ranked near the top of the result lists of Web sites displayed by the search engines when Internet users are searching for material that is related to the Web site.

BACKGROUND OF THE INVENTION

The Internet is a worldwide network of computers and computer networks arranged to allow the easy and robust exchange of information between the users of the computers. Hundreds of millions of people around the world have access to computers connected to the Internet via one of the hundreds of Internet Service Providers (ISPs). Content providers place information, generally multimedia information in the form of graphics and sounds as well as data, at specific locations on the Internet referred to as Web sites that are typically hosted by an ISP. The combination of all the Web sites and their corresponding Web pages on the Internet is generally known as the world wide Web (Web or www).

Web sites may be created using HyperText Markup Language (HTML) to generate a standard set of tags that define how the Web pages for the Web site are to be displayed. Internet users may access content providers' Web sites using a software program known as a browser, such as Microsoft Internet Explorer or Netscape Navigator. After the browser has located the desired Web page, it requests and receives information from the Web page, typically in the form of an HTML document, and then displays the Web page's content for the user. The user may then view other Web pages at the same Web site or move to an entirely different Web site using the browser.

Web site owners often use their Web sites for business purposes, selling a wide range of goods and services as well as displaying paid advertisements. In order to increase revenue, Web site owners try to attract additional Internet users, i.e. customers, to their Web sites. However, with an ever increasing number of Web sites on the Internet, Web site owners are finding it increasingly difficult to attract customers to their Web sites. This trend is likely to continue as the number of businesses trying to gain a presence on the Internet increases the competition for the attention of the Internet users. The future level of success for many of these businesses will depend on their ability to attract Internet users, i.e. customers, to their Web sites.

Web sites are predominantly found by Internet users through the use of a search engine or directory. Some of the more widely used search engines are, for example, AOL, Google, Yahoo, Excite and Dogpile. Internet users are able to enter a search phrase comprised of one or more keywords or a phrase, typically a name of a good or service or a topic of interest, into a search engine. The search engine will display a list of Web sites, i.e. a result list, that the search engine has determined are related to the search phrase along with links to the Web sites. The search engines invariably display the Web sites in a particular order or rank thereby producing a result list. The Web sites that the search engine has determined are of the highest quality or are the Web sites with content most closely related to the search phrase are displayed near the top of the result list, while lower quality Web sites or those not as closely related to the search phrase are displayed lower on the result list. The sheer number of Web sites currently on the Internet can often result in the result list having multiple pages of Web site related to many common search phrases.

In an effort to increase traffic flow to their Web sites, Web site owners typically register their Web sites with one or more search engines. The search engines may try to determine the search phrases that are related to each submitted Web site. The methods used by the search engines vary from search engine to search engine and each search engine typically keeps its exact methodology a secret. In general though, most search engines parse through the various parts of the Web sites submitted to them for registration. The keywords and phrases that are discovered by parsing the submitted Web sites are used to determine if a Web site should be cited based on the search phrase entered by Internet users.

Not surprisingly, Web site owners have noticed that Web sites listed near the beginning of a result list receive substantially more traffic than Web sites listed near the end of a result list. It is thus important not only for a Web site to be on the result list generated by the search engines, but to also be listed as high as possible on the result list. The search engines typically display the Web sites that are determined to be related to a Internet user's search phrase in an order based on the perceived quality of the Web sites by the search engine and the closeness of the contents of the Web sites to the search phrase. The search engines use different algorithms in an attempt to determine the quality of submitted Web sites.

In an effort to raise the rank of their Web sites on the result lists, Web site owners are altering their Web sites so that search engines are more likely to determine their Web sites are of a higher quality. However, few Web site owners are familiar with all the factors used in the algorithms by the search engines and are thus unable to take advantage of all the beneficial alterations that they could be making. Further, operators of search engines are aware of the common tactics used by owners of Web sites to artificially raise their rank and the operators adjust the algorithms of their search engines to counter these efforts. In addition, few Web site owners are familiar with the procedures or want to spend the time in submitting and tracking the status of their Web sites with a large number of search engines.

New systems and process are therefore needed to attract customers and increase traffic flow to Web sites that overcome the limitations of current methods. Thus, there remains a need for systems and processes which reduce or eliminate the problems associated with the conventional methods. Specifically, systems and processes are needed to assist Web site owners in submitting their Web sites to a large number of search engines and to get their Web sites listed as high as possible on the result lists generated by the search engines.

SUMMARY OF THE INVENTION

The present invention addresses these needs by providing improved systems and processes for improving traffic flow to a Web site and specifically for a Web site that is to be submitted for registration with one or more search engines. A software program is preferably used to automate the systems and processes of the invention and to provide quick and repeatable results. Specifically, the invention improves the Web site's chance of being visited by an Internet user after the Internet user uses search terms related to the Web site with a search engine.

As a first step, the software program may be used to accept one or more search phrases from the owner of the Web site. The search phrases should be those that Internet users typically would use with a search engine if they wanted to find the Web site and that the owner would like to result in a high ranking of the Web site on the search engines' result lists.

A search phrase suggestion tool, such as one produced by Overture (found on the Internet at www.overture.com and based in California), may be used to enable users to submit their current search phrase(s) to a tool provided by some search engines, which will return a list of related words and phrases that the search engine's users have searched for within some specified time, for example within the last month. When optimizing a Web site for the Internet's search engines it is advantageous to determine the most likely words and phrases used to search for the Web site, and subsequently put the Web site in the most opportune position to score high in search engines result lists for those words and phrases. The software program may parse through the Web site and its Web pages using algorithms to analyze the Web site's compatibility with the search phrases. The software program may also check on other known factors used by search engines in ranking Web sites, such as, the textual content, spiderability, use of frames, graphical content or graphical links and the use of Flash animation.

The software program may display the results of the analysis with emphasis on any problems found along with directions and advice on how to make recommend changes. The owner may then manually make the recommended changes to the Web site as desired.

After the Web site has been analyzed and optimized, the Web site may be submitted for registration with a plurality of different search engines and directories. The automated nature of the software allows the owner of a Web site to enter registration information one time and to be able to submit the Web site to a plurality of different search engines and directories. The owner may select the search engines from a list that the owner would like the program to submit the Web site to, thereby relieving the owner from having to manually submit the Web site to each and every desired search engine.

The software program may also track the status of the Web site with each of the search engines. In a preferred embodiment, the submission date and submission results may be made available to the owner for each of the submitted search engines. This one point source of information allows the owner to easily keep track of which search engines have accepted the Web site and the status of the Web site with the remaining search engines.

In another embodiment of the invention, a Web site owner may select one or more search engines to be submitted to. The program must either determine, for example by experimenting and noticing how changes to a Web site produce changes to a search engine's results, or be given information regarding the factors used by the selected search engines. In this embodiment, the program then specifically analyzes the Web site based on the factors used by the selected search engines. The software program may be used to mimic the algorithms used by the search engines in ranking submitted Web sites in order for the analysis to accurately reflect how the search engines will rank the Web site. After the analysis, the software program may request acceptance of the recommended changes and, after acceptance of the recommended changes by the owner, automatically edit the Web site to update and optimize the Web site. The Web site may then be submitted to the selected search engines. Care should be taken during this process to avoid any allegations of engaging in deliberate search engine spamming. Search engine owners may black list the Web site if they think the Web site's content is written primarily to fool the search engine's ranking algorithm and not for the legitimate use of Internet users.

Search engines from time to time may change their algorithms to fine tune and improve their ranking methodologies. In another embodiment of the invention, the Web site may maintain its optimized structure by periodically analyzing, optimizing and resubmitting the Web site to the search engines. For example, every 30 days the selected search engines' algorithms may be reevaluated to check for any changes. The Web site may be re-optimized if needed to compensate for any changes found in the search engine's ranking algorithms. The re-optimization may be manually done by the owner or the program may automatically make the recommended changes. The automated updates may be pre-approved by the owner or approved by the owner at the time of the edits. If any changes are made to the Web site, the Web site may be resubmitted to the selected search engines. This process may be periodically repeated so that the Web site remains in an optimized condition in relation to the selected search engines.

Additional advantages and aspects of the present invention will become apparent in the following detailed description and claims.

BRIEF DESCRIPTION OF THE DRAWINGS

FIG. 2 is a screen shot from a software program that may be used during a Web site analysis process;

FIG. 3 is a screen shot from a software program that may be used during a Web site optimization process;

FIG. 4 is a screen shot from a software program that may be used during an automated Web site submission process;

FIG. 5 is a screen shot from a software program that may be used to display a Web site submission status with various search engines;

DETAILED DESCRIPTION OF THE PREFERRED EMBODIMENTS

Figure 1:
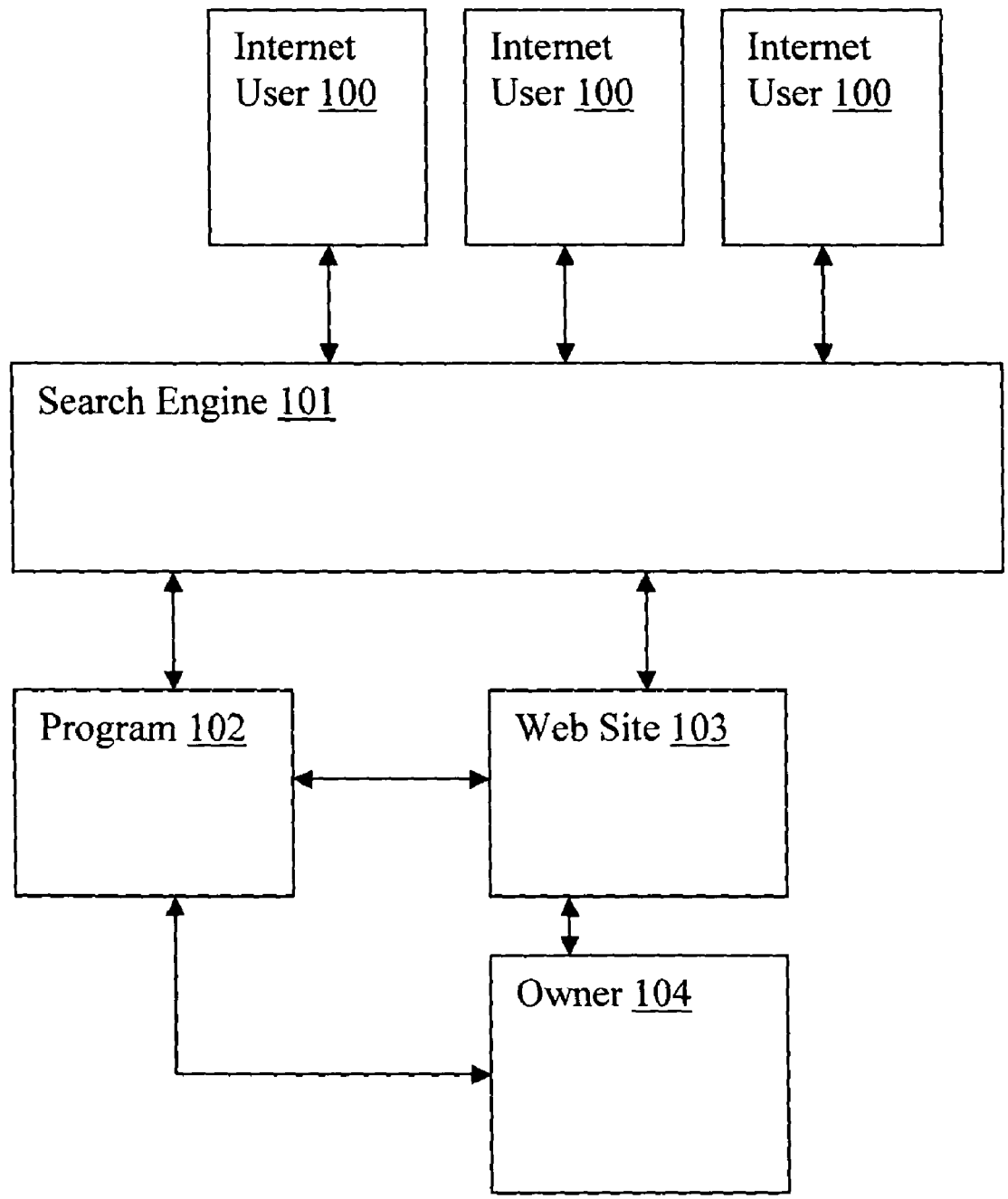
FIG. 1 is a diagram illustrating the interrelationships between different elements related to the invention.

The present invention will now be discussed in detail with regard to the attached drawing figures which were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

The invention will now be described in greater detail with continuing reference to FIG. 1. Many Internet users 100, i.e. customers, use search engines and directories (hereinafter referred to as search engines 101) as their primary tools in locating Web sites 103 on the Internet that sell products or services of interest to them. In fact, the majority of purchases that are made from most Web sites 103 come from Internet users 100 that were directed to the Web site 103 from a search engine 101. It is thus very important for a Web site 103 to be customized and have features that will enhance the ability of search engines 101 to guide Internet users 100 to the Web site 103.

Figure 6:
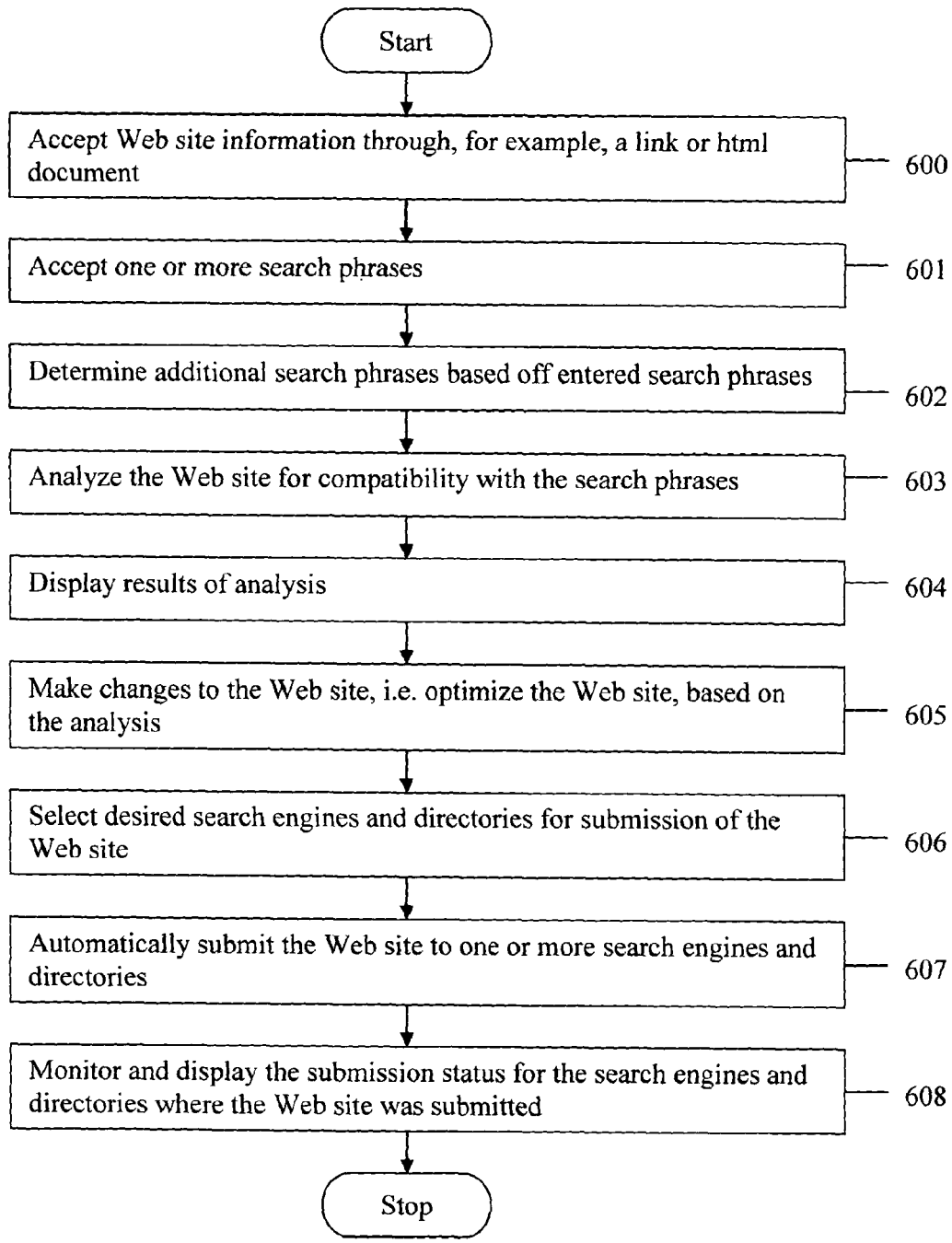
FIG. 6 is a flowchart illustrating one embodiment of the invention.

In a preferred embodiment of the present invention, a program 102 may be used to analyze a Web site 103, optimize the Web site 103, submit the Web site 103 to a plurality of search engines 101 and track the submission status of the Web site 103 with the search engines 101. The program 102 is preferably a software program that may be written in any desired programming language. The program 102 is preferably able to parse through the code of the Web site 103 and in some of the embodiments of the invention must be able to modify the code of the Web site 103. The process will be more fully disclosed below with continuing reference to the steps in the flowchart illustrated in FIG. 6.

Web Site Analysis

Figure 2:
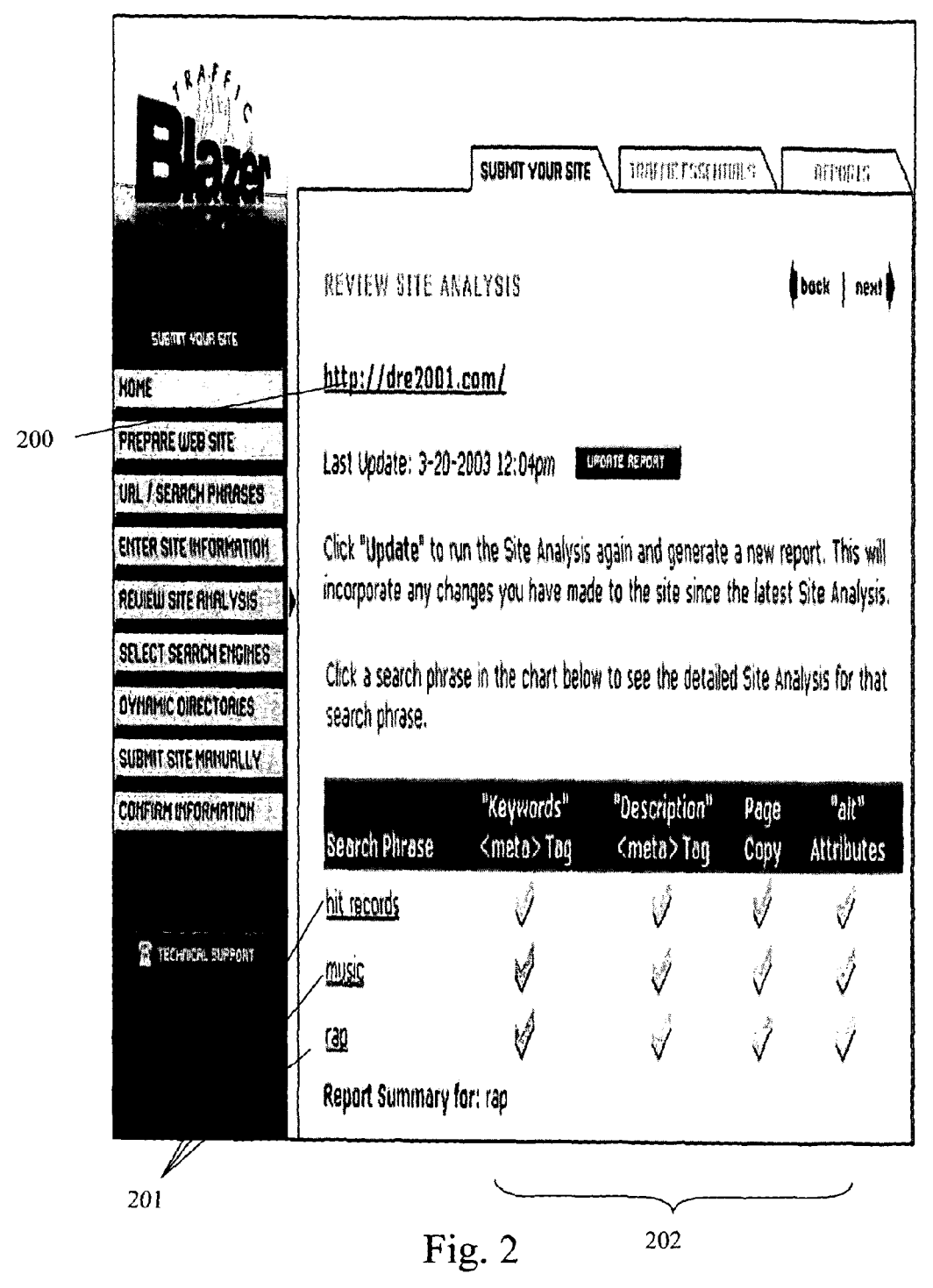

An owner 104 of a Web site 103 may use the invention to perform a Web site analysis that inspects the same features of the Web site 103 that search engines 101 typically inspect. Web sites 103 typically include multiple Web pages and the invention may assist the owner 104 of a Web site 103 in analyzing the entire Web site 103. If the invention detects any problems or potential problems with the Web site 103 or any of its pages, a site analysis report may be generated that flags these problems and provide suggested solutions. An example of a Web site analysis report is illustrated in FIG. 2.

The analysis may start with the owner 104, or other person with authority to edit the Web site code, directing a software program 102 to the location of a Web site 103. (Step 600) The software may be given a link 200 to the Web site so the software program 102 may analyze the Web site 103 over the Internet or the program 102 may be given data, typically in the form of one or more html pages, to permit the program 102 to analyze the Web site 103. The owner 104 may also insert one or more search phrases 201 into the program 102. (Step 601) The search phrases 201 are preferably similar to the keywords or phrases entered by Internet users 100 into search engines 101 that the owner 104 of the Web site 103 wants to trigger the listing of the Web site 103 by the search engines 101.

The program 102 may determine additional search phrases based off the search phrases 201 from the owner 104. (Step 602) A thesaurus-type database may be used to find additional search phrases 201 related to the search phrases 201 entered by the owner 104. In a preferred embodiment, data from search phrases 201 actually entered into one or more search engines 101 may be used in combination with the owner's search phrases 201 to determine additional related search phrases 201.

A search phrase suggestion tool may be used to enable owners 104 to submit their current search phrase(s) 201 to a tool provided by some search engines 101. The search phrase suggestion tool will return a list of related search phrases 101 (words and phrases) that the Internet users 100 of the search engine 101 have searched for within some specified time, for example within the last month. That way, the owner 104 of the Web site 103 may review the returned list and the popularity of each of the suggested search phrases 201, and, based on that, decide which search phrase(s) 201 to use with the program's site analysis.

The program 102 may review the Web site's 103 compatibility with each of the found search phrases 201. The search phrases 201 may be the owner 104 entered search phrases 201, the program 102 determined search phrases 201 and the search phrases 201 supplied by one or more search engine suggestion tools. (Step 603) The search phrase compatibility may be determined by the program 102 parsing the Web site code, typically written in HTML, searching for the number of occurrences of each search phrase 201. The program 102 may also check the different Web site elements, such as the title tag, description meta tags and keywords meta tags for the search phrases 201.

The program 102 may also review the textual content of the Web site 103. Search engines typically will list Web sites 103 higher on the result list that include a substantial amount of textual content. The program 102 may count the number of character strings separated by spaces or simply the total number of characters. The program 102 may assist the owner 104 of the Web site 103 by displaying any problems in this area and how to remedy the situation.

The program 102 may also check that the home page of the Web site 103 has links, e.g. HTML hyperlinks, to the other Web pages in the Web site 103 and that the other Web pages have a link to the home page. When reviewing a Web site 103, search engines 101 are able to locate the different pages of the Web site through the links on the Web pages. Search engines 101 tend to rate Web sites 103 with multiple high quality Web pages higher, and thus rank them higher on the result list, than Web sites 103 with only one or a very few Web pages. Including the links on each Web page assist the search engines 101 in finding and evaluating the entire Web site 103. The ability of the different Web pages of a Web site 103 to be found by a search engine 101 in this manner is referred to as the spiderability of the Web site 103. The program 102 may assist the owner 104 of the Web site 103 in determining the spiderability of the Web site 103 and making or suggesting improvements to the Web site 103.

The program 102 may also check to see if the Web site 103 has any HTML pages that are inside, i.e. "framed", by other HTML Web pages. Some Web site designs use the home page to frame other Web pages as part of the programming structure of the Web site 103. This design usually results in the home page having lots of HTML code, but little or no content. Search engines 101 will often give a Web site 103 a poor rating based on the lack of content in the home page. Framed Web pages in Web sites 103 should thus be avoided if possible.

The program 102 may also check to see if the Web site 103 uses graphics to display textual content or links. Search engines 101 cannot read text or links on the Web site 103 that are written in a bit map format or other graphical protocol. This results in graphical information that may have raised a Web site 103 in ranking on a result list to be not considered by the search engines 101. Flash is an example of a common format for multimedia presentations on a Web page that cannot be easily reviewed by most search engines 101 and should thus used with care and preferably in combination with non-Flash, HTML format renditions of the same site functionality embedded in the animated elements.

The results of the above described analysis of the Web site may be graphically displayed for the owner 104 of the Web site 103 with descriptions of recommended changes to the Web site 103 as needed. (Step 604) The results may be displayed, for examples, in the area illustrated at 202 in FIG. 2 and in the area 300 in FIG. 3.

Web Site Optimization

After the Web site 103 is analyzed, the problems that were found may be corrected, thereby optimizing the Web site 103 and improving its ranking in the result lists. (Step 605) Problems or potential problems may be corrected by reporting the problems in a site analysis report 300 along with easy-to-follow directions and advice on how to manually fix these problems. Each of the corrections may be accompanied by a link to more thorough information about the source and nature of the problem. The owner 104 of the Web site 103 may then edit the Web site code as desired, preferably to comply with as many of the suggestions made by the program 102 as possible.

In another embodiment of the invention, the program 102 may be used to automate the editing process of the Web site code. The invention may list the problems found in the Web site 102 and allow the owner 104 of the Web site 103 to approve or disapprove the suggested corrections to the Web site 103. The program 102 may then automatically edit the Web site code, typically HTML code, and make the approved corrections to the Web site 103. The program 102 may then create a report detailing the changes made to the Web site code. Automated changes to the Web site code have the advantage of not requiring the owner 104 of the Web site 103 to make edits to the Web site code which might be difficult for the owner 104 due to the owner's lack of technical abilities or time constraints. To simplify the process for the owner 104, it is preferred for the program 102 to perform as many of the corrections automatically as possible to reduce the amount of editing required by the owner 104 of the Web site 103. Some desired corrections to the Web site 103 may not be easily automated by the program 102. In those situations, a combination of manual and automated edits may be performed, where the program 102 makes as many edits as it can automatically to reduce the amount of edits to the Web site code required of the owner 104.

Web Site Submission to Search Engines

The owner 104 of a Web site 103 may select one or more desired search engines 101 for submission to by the program 102. (Step 606) FIG. 4 at 400 illustrates one possible layout for allowing the owner 104 of a Web site 103 to select the desired search engines 101 for submission of the Web site 101 located at a link 200. In addition to the home page of the Web site 103, additional product, service, informational, etc. Web pages with unique content, including keywords and search phrases 201, may also be submitted. The more Web pages listed in the search engines 101 for the Web site 103, the more traffic the Web site 103 is likely to receive. The program 102 may also allow the owner 104 to submit the Web site 103 to providers of paid-for-inclusion search engines 101 or pay-per-click advertising, such as the Overture search engine 101.

Because the program 102 may be designed to take care of the actual submission procedures, the owner 104 of the Web site 103 may advantageously only have to enter the applicable Web site 103 information, select the one or more desired search engines 101 to which the Web site 103 should be submitted and click a "Submit" key. The program 102 may be designed to handle the rest of the submission process of the Web site 103 to the search engines 101. (Step 607) Each search engine 101 has its own method of accepting Web site 103 information and the program 102 may be designed to accommodate the requirements of each search engine 101, thereby relieving the owner 104 of the Web site 103 from this burden.

Web Site Submission Status

Figure 5:
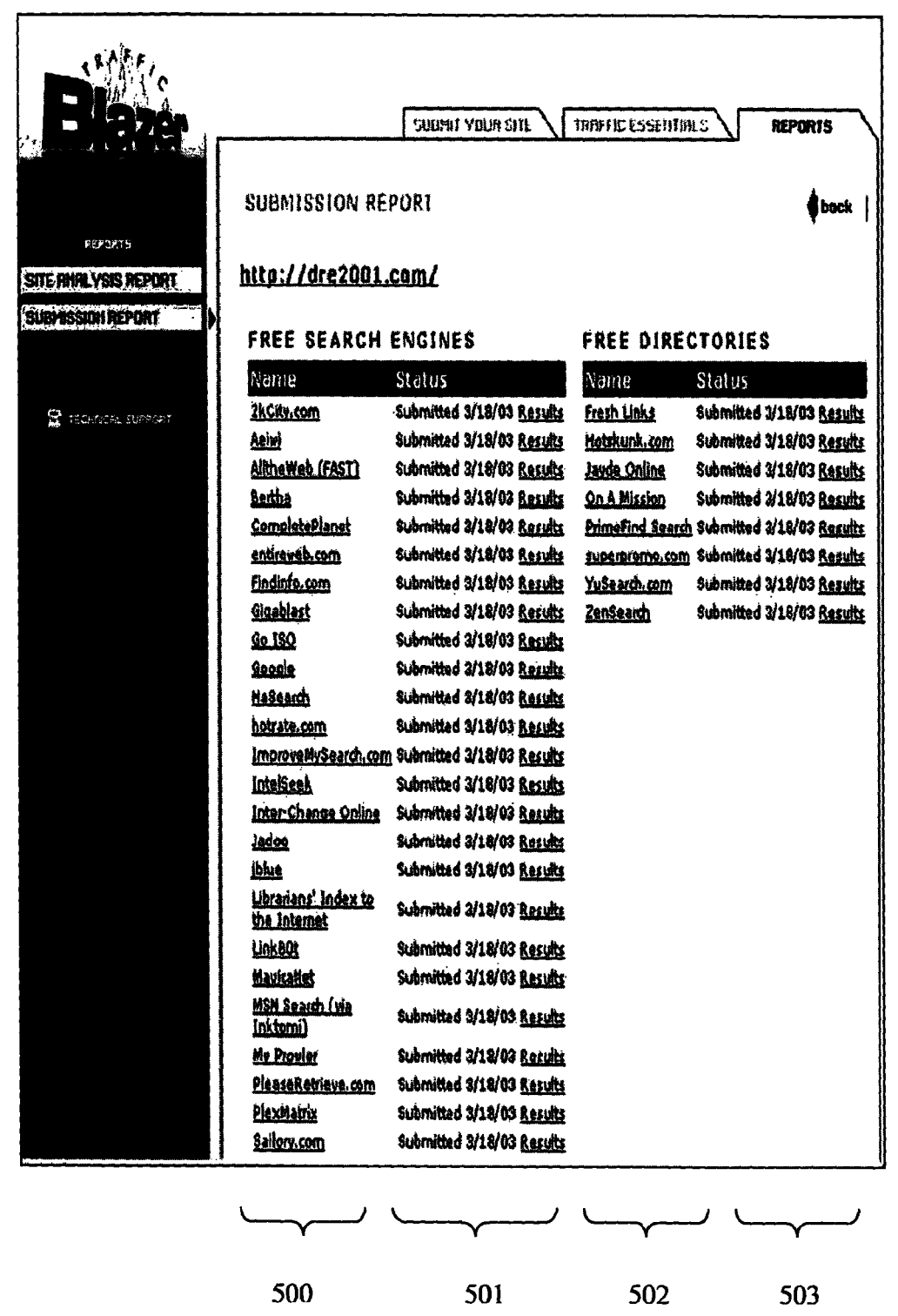

After the Web site 103 has been submitted, a submission status for each of the search engines 101 may be displayed in a submission report. (Step 608) A sample submission report is shown in FIG. 5, showing the names of the search engines 500, status of the search engines 501, names of the directories 502 and status for the directories 503 for the Web site 103. The submission report may be used to track the status of the Web site 103 at the selected and submitted search engines 101. For each search engine 101, the submission status may be classified, for example, as "Pending," "Submitted" or "Submission Failed." If the latter status is displayed, the program 102 may be used to continue to attempt to submit the Web site 103 to the search engine 101. Once the targeted search engine 101 has acknowledged the submission, the status may be listed as "Submitted." In addition to the submission status, the report may also be used to display each search engine and directory's initial submission response. That way, the owner 104 of the Web site 103 will instantly know whether or not each of the search engines 101 has accepted the Web site 103 submission.

Automated Web Site Updating Methodology

Figure 7:
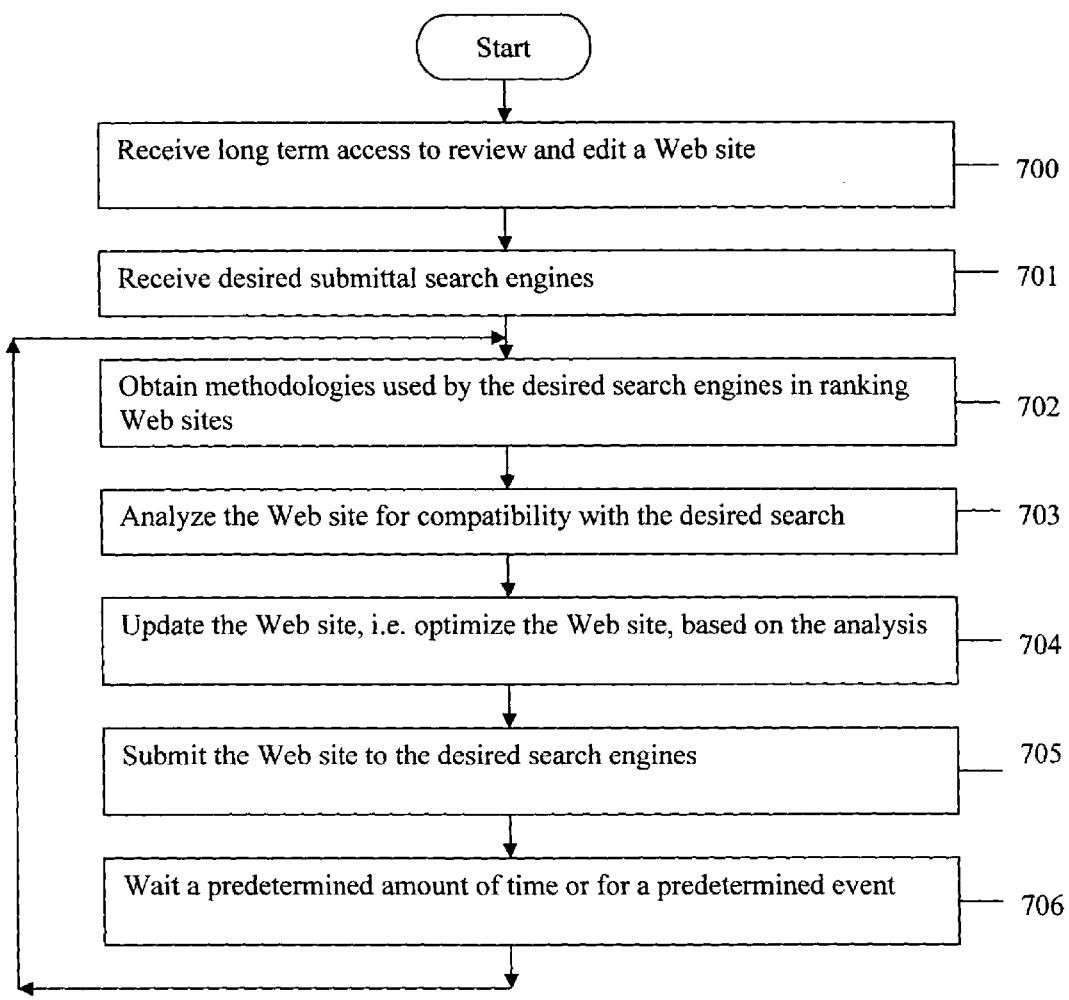
FIG. 7 is a flowchart illustrating a second embodiment of the invention.

Another embodiment of the invention will now be described with reference to the flow chart in FIG. 7. This embodiment allows a Web site 103 to be periodically updated to obtain improved ranking positions within a selected group of search engines 101. The periodic updates to the Web site 103 are desirable since the ranking methodologies used by search engines 101 are also periodically updated. The program 102 encompassing this embodiment may be given long term access to review and preferably even to modify code of the Web site 103. (Step 700) The program 102 needs access to the code of the Web site 103 for as long as the program 102 is to continue to operate and optimize the Web site 103.

The owner 104 may select one or more desired search engines for submission by the program. (Step 701) Where the prior embodiment of the invention focused on improving all or at least most of the known elements commonly used by search engines 101 in ranking Web sites 103, this embodiment focuses on improving those elements specifically looked at by the chosen search engines 101. It is therefore highly desirable to have detailed information regarding the methodology used by the selected search engines 101 in ranking Web sites 103. This is difficult since the timing and content of the updates to the search engines 101 are often kept secret by the operators of the search engines 101.

Operators of search engines 101 tend to keep their particular methodology for ranking Web sites 103 a secret. However, the methodologies used by the selected search engines 101 may be obtained, for example, by either paying the operators of the search engines 101 for the information regarding their methodology or by reverse engineering the methodology used by the search engines 101. (Step 702) Reverse engineering of the ranking methodology used by the search engines 101 may be accomplished, for example, by making small changes to a Web site 103, submitting the Web site 103 to a search engine 101 and then checking how the changes affected the ranking of the Web site 103 with the search engine 101. Other methods include reviewing already submitted Web sites 103 to the search engines 101 and reviewing their ranking by the search engines 101. The speed of the reverse engineering process may be increased by creating a program to automate this process. The program may check on the factors and the weight of the factors used by the search engines 101 in ranking various Web sites 103.

Once the ranking methodology for each of the selected search engines 101 has been determined, the program may analyze the Web site 103 according to the methodology of the selected search engines 101. (Step 703) This may result in a list of desired edits for the code of the Web site 103 for each of the selected search engines 101. Typically the desired edits for one search engine 101 will either help or not influence the ranking of the Web site 103 with the other search engines 101, but this may not always be the case.

If edits to improve the ranking of the Web site 103 with one search engine 101 hurt the ranking of the Web site 103 with another search engine 101, further analysis may be performed. The invention may look at the importance of the conflicting search engines 101 in influencing traffic to the Web site 103. Greater weight may be given to improving search engines that result in improved traffic to the Web site 103 verses search engines 101 that are not as effective in directing traffic to the Web site 103. In addition, the impact of the improvements compared to the impact of the harm to the ranking of the effected search engines for the edits may also be determined. In a preferred embodiment, the program 102 selects and makes the edits to the code of the Web site 103 that maximizes the traffic to the Web site 103 via all the search engines 101 as opposed to trying to maximize the traffic to the Web site from each individual search engine. (Step 704)

The Web site, after being analyzed and optimized, may be submitted to the search engines 101 selected by the owner 104. (Step 705) The program 102 may automate the submission process and keep track and display for the owner 104 the status of the submission process for each of the selected search engines 101 as previously disclosed.

The process as described may be terminated after the Web site 103 has been submitted and, hopefully, accepted by the selected search engines 101. However, in another embodiment, the program 102 may, from time to time, monitor the ranking methodologies used by the selected search engines 101. Search engines 101 update their methodologies in ranking Web sites 103 so the Web site 103 may need to be further edited to account for these updates. The monitoring of the selected search engines 101 and editing of the Web site 103 may be on a fixed time schedule, for example once every 30 days, or the program 102 may monitor the selected search engines 101 on a more frequent schedule, such as about once per day, and edit the Web site 103 when an update is detected in one of the selected search engines 101. (Step 706) The more frequent the monitoring of the selected search engines 101 and the editing of the Web site 103, the more consistent the Web site 103 will remain in an optimized condition.

The program 102 used to implement the invention may be sold to the owner 104 and placed on the owner's personal computer or the program 102 may reside on a server and accessed by the owner 104 via a third party Web site.

In view of the foregoing, it will be understood by those skilled in the art that the systems and processes of the present invention can facilitate the optimization of a Web site 103 and the submission of the Web site 103 to one or more search engines 101. The above-described embodiments have been provided by way of example, and the present invention is not limited to these examples. Multiple variations and modification to the disclosed embodiments will occur, to the extent not mutually exclusive, to those skilled in the art upon consideration of the foregoing description. Such variations and modifications, however, fall well within the scope of the present invention as set forth in the following claims.

What is claimed is:

1. A method for increasing traffic flow to a Web site, comprising the steps of:
 a) receiving, by one or more computers, access to a Web site code, wherein a Web site comprises the Web site code;
 b) receiving, by the one or more computers, a list of one or more search engines to submit the Web site to for registration;
 c) analyzing, by the one or more computers, the Web site code, wherein analyzing the Web site code comprises checking for a known factor in the Web site code used by a plurality of search engines in ranking a plurality of Web sites for registration and determining a spiderability of the Web site;
 d) causing the Web site code to be edited based on a result from analyzing the Web site code; and
 e) submitting, by the one or more computers, the Web site, with the edited Web site code, for registration to the one or more search engines on the list.

2. The method of claim 1, wherein causing the Web site code to be edited comprises manually editing the Web site code.

3. The method of claim 1, wherein causing the Web site code to be edited comprises a computer program automatically editing the Web site code.

4. The method of claim 1, wherein analyzing the Web site code further comprises parsing through the Web site code.

5. The method of claim 1, further comprising receiving a search phrase.

6. The method of claim 1, further comprising automatically generating a search phrase for the Web site.

7. The method of claim 1, wherein analyzing the Web site code further comprises reviewing the Web site for compatibility with a search phrase.

8. The method of claim 1, wherein analyzing the Web site code further comprises reviewing a textual content of the Web site.

9. The method of claim 1, wherein analyzing the Web site code further comprises checking for a framed web page within the Web site.

10. The method of claim 1, wherein analyzing the Web site code further comprises checking for a graphic used to display a textual content.

11. A method for increasing traffic flow to a Web site from one or more search engines, comprising the steps of:
 a) receiving, by one or more computers, access to review a Web site, wherein a Web site code defines how a plurality of Web pages for the Web site will be displayed by a browser;
 b) receiving, by the one or more computers, a list of one or more search engines to submit the Web site to for registration;
 c) analyzing, by the one or more computers, the Web site code by checking a spiderability of the Web site;
 d) facilitating, by the one or more computers, a modification of the Web site code based on the analyzing of the Web site code in order to increase a traffic flow to the Web site from at least one of the search engines on the list; and
 e) submitting, by the one or more computers, the Web site for registration, having the modified Web site code, to the one or more search engines.

12. The method of claim 11, wherein the facilitating in step d) includes the step of listing a plurality of suggested edits to manually edit the Web site code.

13. The method of claim 11, wherein the facilitating in step d) includes the step of automatically modifying the Web site code.

14. The method of claim 11, wherein the one or more computers comprises a third party server accessible by an owner of the Web site.

15. The method of claim 11, wherein the one or more computers comprises a personal computer accessible by an owner of the Web site.

16. The method of claim 11, further comprising the step of receiving at least one search phrase from an owner of the Web site.

17. The method of claim 11, further comprising the step of determining at least one search phrase.

18. The method of claim 11, further comprising the step of receiving at least one search phrase from a search phrase suggestion tool.

19. The method of claim 11, wherein the Web site code comprises HyperText Markup Language.

20. A method for increasing traffic flow to a Web site from a search engine, comprising the steps of:
   a) receiving, by one or more computers, access to review a Web site, wherein the Web site comprises a Web site code, wherein at least some of the Web site code defines how the Web site is to be displayed by a browser;
   b) receiving, by the one or more computers, a first search phrase related to the Web site;
   c) receiving, by the one or more computers, a list of one or more search engines to submit the Web site to for registration;
   d) determining, by the one or more computers, a ranking methodology used by at least one of the search engines on the list;
   e) analyzing, by the one or more computers, the Web site code using the determined ranking methodology and by checking a spiderability of the Web site;
   f) facilitating, by the one or more computers, a modification of the Web site code based on the analyzing the Web site code to increase an expected traffic flow to the Web site from the search engine; and
   g) submitting, by the one or more computers, the Web site for registration, having a modified Web site code, to the one or more search engines on the list.

21. The method of claim 20, wherein the facilitating includes the step of listing suggested edits to manually modify the Web site code.

22. The method of claim 20, further including the step of automatically modifying the Web site code.

23. The method of claim 20, wherein the one or more computers comprises a third party server accessible by an owner of the Web site.

24. The method of claim 20, wherein the one or more computers comprises a personal computer accessible by an owner of the Web site.

25. The method of claim 20, wherein the first search phrase is entered by an owner of the Web site, and further comprising the step of determining a second search phrase.

26. The method of claim 20, wherein the first search phrase is entered by an owner of the Web site, and further comprising the step of receiving a second search phrase from a search phrase suggestion tool.

27. The method of claim 20, wherein the analyzing the Web site code step includes checking for a search engine parsing problem in the Web site code.

28. A method for increasing traffic flow to a Web site from a plurality of search engines, comprising the steps of:
   a) receiving, by one or more computers, access to review a Web site, wherein the Web site comprises a Web site code, wherein the Web site code comprises for defining how the Web site is to be displayed by a browser and at least one Web site element;
   b) receiving, by the one or more computers, a first search phrase related to the Web site;
   c) receiving, by the one or more computers, a list of search engines to submit the Web site to for registration;
   d) determining, by the one or more computers, a ranking methodology for at least two of the search engines in the list of search engines;
   e) analyzing, by the one or more computers, the Web site code using the determined ranking methodologies and by checking a spiderability of the Web site;
   f) facilitating, by the one or more computers, a modification of the Web site code based on the analyzing the Web site code to increase an expected traffic flow to the Web site; and
   g) submitting, by the one or more computers, the Web site for registration, having a modified Web site code, to the search engines on the list.

29. A method for increasing traffic flow to a Web site from one or more search engines, comprising the steps of:
   a) receiving, by the one or more computers, access to review a code, wherein the code comprises defining how a web page for a Web site is to be displayed by a browser;
   b) receiving, by the one or more computers, a first search phrase related to the Web site;
   c) receiving, by the one or more computers, a list of one or more search engines to submit the Web site to for registration;
   d) determining, by the one or more computers, at least one ranking methodology used by at least one of the search engines on the list;
   e) analyzing, by the one or more computers, the code using the at least one determined ranking methodology and by checking a spiderability of the Web site;
   f) causing, by the one or more computers, the code to be edited based on the analyzing the code;
   g) submitting, by the one or more computers, the Web site for registration to the one or more search engines on the list; and
   h) repeating steps d) through g) to maintain an increased level of traffic flow to the Web site.

30. The method of claim 29, wherein the causing the code to be edited comprises listing suggested edits to manually edit the code.

31. The method of claim 29, wherein the one or more computers comprises a third party server accessible by an owner of the Web site.

32. The method of claim 29, wherein the one or more computers comprises a personal computer accessible by an owner of the Web site.

33. The method of claim 29, wherein the search phrase is entered by an owner of the Web site and further comprising the step of determining a second search phrase.

34. The method of claim 29, wherein the search phrase is entered by an owner of the Web site and further comprising the step of receiving a second search phrase from a search phrase suggestion tool.

35. The method of claim 29, wherein the analyzing the code includes checking for a search engine parsing problem in the Web site.

* * * * *